United States Patent
Asthana et al.

(10) Patent No.: US 7,603,304 B2
(45) Date of Patent: Oct. 13, 2009

(54) DOMAIN SPECIFIC RETURN ON INVESTMENT MODEL SYSTEM AND METHOD OF USE

(75) Inventors: Ajay Asthana, Long Branch, NJ (US); Vikram Gupta, Shaker Heights, OH (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 11/075,015

(22) Filed: Mar. 8, 2005

(65) Prior Publication Data

US 2006/0206374 A1    Sep. 14, 2006

(51) Int. Cl.
  G06Q 40/00    (2006.01)
  G06F 17/30    (2006.01)
  G06F 17/50    (2006.01)

(52) U.S. Cl. ............... 705/35; 705/10; 705/7; 705/36 R (58) Field of Classification Search ............ 705/7, 705/1, 35, 38, 8, 400, 10, 36 R
See application file for complete search history.

(56) References Cited

U.S. PATENT DOCUMENTS

| | | | |
|---|---|---|---|
| 5,521,814 | A | 5/1996 | Teran et al. |
| 6,292,830 | B1 * | 9/2001 | Taylor et al. ........... 709/224 |
| 6,363,488 | B1 * | 3/2002 | Ginter et al. ........... 705/14 |
| 6,427,140 | B1 * | 7/2002 | Ginter et al. ........... 705/53 |
| 2002/0116282 | A1 | 8/2002 | Martin et al. |
| 2002/0169658 | A1 | 11/2002 | Adler |
| 2003/0033192 | A1 | 2/2003 | Zyman et al. |
| 2003/0093414 | A1 | 5/2003 | Litzow et al. |
| 2003/0212643 | A1 | 11/2003 | Steele et al. |
| 2004/0002888 | A1 * | 1/2004 | Draper et al. ........... 705/11 |
| 2004/0039620 | A1 | 2/2004 | Ando et al. |
| 2004/0073496 | A1 | 4/2004 | Cohen |
| 2005/0021348 | A1 * | 1/2005 | Chan et al. ........... 705/1 |

OTHER PUBLICATIONS

Thamhain, Hans, J. "Team Leadership Effectiveness in Technology Based Project Environments" Dec. 2004, Project Management Journal V35N4.*
McCarthy, Brian "Instant Gratification or Long-Term Value? A Lesson in Enhancing Shareholder Wealth" 2004, Jornal of Business Strategy V25N4.*
Wells, John et al. "Understanding Decision-Making in Data Warehousing and Related Decision Support Systems:An Explanatory Study of a Suctomre Relationship Management Application"Oct.-Dec. 2002, Informtaion Resources Manegemnt Fournal V15N4.*
Basnet, Chuda "Production Management in New Zealand; Is Education Relecant to Practice?" 2000 International Journal of Operations and Production Management V20N6.*

* cited by examiner

*Primary Examiner*—Kelly Campen
(74) *Attorney, Agent, or Firm*—William E. Schiesser; Greenblum & Bernstein P.L.C.

(57) ABSTRACT

A system and method for creating and executing a business model for domain specific decisions to compare possible alternative business solutions to maximize results is provided. A domain-specific return on investment (ROI) or financial measurements model and a calculator for buying and selling information technology based solutions targeted at improving overall business efficiency and effectiveness by reducing lead time, improving probability of success, creating an innovative environment, enhancing corporate image, and reducing cost and improving revenues. These business objectives are connected to the capabilities provided by vendor solutions which are based on technology, process, people, science, or the like, typically through concrete initiatives. Solution components are quantified and used to calculate financial impacts for solution choices.

23 Claims, 6 Drawing Sheets

FIGURE 1

| OBJECTIVES | | | | | | |
|---|---|---|---|---|---|---|
| Objectives & Initiatives | Reduce DD&D Lead Time | Improve Success Probability | Create Innovative Environment | Reduce Costs and Improve Efficiencies | Improve Revenue and Effectiveness | Build Organiz'l Image |
| Sciences/ Application | 1. Utilize Genomics/ Proteomics Technologies, HTS, clinical trial | 5. Improve the Quality of Targets & Leads | 9. Provide failure-tolerant culture, Support rational risk-taking & incentives and rewards | 13. Obtain Economies-of-Scale including outsourcing | 17. Effective Pipeline and Portfolio Management | 21. Corporate Citizenship and Culture |
| Process/ Operations | 2. Eliminate Bottlenecks & Parallelize Process | 6. Develop Feedback-driven processes with multiple attrition points | 10. Enhance the Knowledge capture and dissemination process | 14. Reengineer process to automate, eliminate redundancies & reuse assets | 18. Mergers, Acquisitions, Alliances & Licenses to other's research | 22. Develop Customer Focus process - physician, hospitals, payers etc. |
| People/ Organization | 3. Promote WW researcher (biologist and chemists) Collaboration | 7. Cross-Train researcher to identify failures (chemical biologists) | 11. Incentives for Patents & original work, Knowledge sharing | 15. Improve personal productivity through IT | 19. Improve effectiveness of Go/NoGo decisions through DSS | 23. Hire and retain the best and giving them an opportunity to grow |
| Information Technology | 4. Integrate Applications & Data; Use Bioinformatics Technology | 8. Extensively use "In-Silico" Simulation and Prediction Technology | 12. Flexible, Open Standard-based Infrastructure - | 16. Modernize Architecture – Create value through existing infrastructure | 20. Create new Value through Technology | 24. Technology Leadership (Known for adept use of IT) |

DOMAIN SPECIFIC RETURN ON INVESTMENT MODEL SYSTEM AND METHOD OF USE

FIELD OF THE INVENTION

The invention generally relates to a system and method for creating and executing a domain specific business model for technology solution decisions and, more specifically, to a system and method for creating and executing a structured domain specific business model for technology solution decisions to compare possible alternative solutions to maximize business value propositions.

BACKGROUND DESCRIPTION

Survey's of CEOs, CFOs, COOs and CIOs have found that 70% or more of information technology (IT) spending decisions by companies in various industries such as, for example, pharmaceutical companies, are based on a demonstration of rigorous business case and a concrete return on investment. One industry survey found that, on the one hand, 79% of the enterprises considered the advice of vendors in the development of the business case and, on the other hand, more than 80% of these enterprises regard vendor claims with strong skepticism. The reason often stated for this dilemma is that enterprises felt that vendors have exaggerated the positive and omitted the negative. Further complicating the dilemma are situations where multiple goals are involved.

An industry study associated with the survey found that vendors could better align their business case efforts by addressing the business objectives (e.g., key issues and goals of corporate executives) of the customer and connecting them to their technology solutions transparently. Several techniques and existing tools strive to provide some measure of control toward quantifying business objectives and decisions, however, these tools and techniques have basic limitations which include, for example, but not limited to:

(i) generic and focus on productivity oriented measures;
(ii) inflexible options and use numbers with questionable credibility;
(iii) hard to use and customize by sales personnel;
(iv) require strong financial background to interpret results; and
(v) seldom involve the customer in the development or configuration process.

These techniques do not provide a structured approach for quantifying business goals and possible solutions which might include such exemplary choices as technology based alternatives, personnel focused contributions and/or process choices for maximizing solutions or financial results.

SUMMARY OF THE INVENTION

In an aspect of the invention, a method of deciding business alternatives is provided. The method comprises the steps of determining one or more objectives associated with a business and determining one or more capabilities of the business. The method further comprises the steps of analyzing at least one solution for one or more initiatives associated with the one or more objectives and the one or more capabilities and generating a financial measurement based on results of the analyzing step which shows the contribution of the one or more initiatives to achieve the one or more objectives of the business.

In another aspect of the invention, a method of comparing business alternatives is provided. The method comprises the steps of creating a value matrix having one or more initiatives associated with objectives and capabilities and associating one or more solutions to the one or more initiatives, the one or more solutions having a cost and a benefit and calculating a financial measurement based on a selected initiative of the value matrix providing an objective basis to deem the initiative feasible according to a business goal.

In another aspect of the invention, a system for comparing business alternatives is provided. The system comprises means for creating a value matrix having one or more initiatives associated with objectives and capabilities and means for associating one or more solutions having a cost and a benefit to the one or more initiatives. The system further comprises means for quantifying a best practice associated with the one or more solutions and means for calculating a financial measurement based on the one or more solutions derived from the value matrix and at least in part on the quantified best practice providing an objective basis to deem the one or more solutions acceptable.

In another aspect of the invention, a computer program product is provided. The computer product comprises a computer usable medium having readable program code embodied in the medium and the computer program product includes at least one component to determine one or more objectives associated with a business and to determine one or more capabilities of the business. The computer program also includes at least one component to analyze at least one solution for one or more initiatives associated with the one or more objectives and the one or more capabilities and generate a return on investment (ROI) based on results of the analyzing which shows the contribution of the one or more initiatives to achieve the one or more objectives of the business.

BRIEF DESCRIPTION OF THE DRAWINGS

FIG. 2 is an illustration of a value matrix;

DETAILED DESCRIPTION OF EMBODIMENTS OF THE INVENTION

This invention is generally directed to a system and method for creating and executing a business model for domain specific decisions and, more specifically, to a system and method for creating and executing a structured business model for domain specific decisions to compare possible alternative business solutions to maximize results. In one aspect, the system and method of the invention provides a domain-specific return on investment (ROI) model and a calculator, perhaps, for buying and selling information technology based solutions targeted at improving overall business efficiency and effectiveness. The model is typically based on identifying critical or substantial business objectives of senior executives (or other decision makers) such as, for example, reducing lead time, improving probability of success, creating an innovative environment, enhancing image, reducing cost and improving revenues, or the like and connecting them to technology solutions such as electronic data capture, server consolidation, document management, collaboration between scientists etc.

The system and method of the invention provides the suppliers of information technology (IT) based solutions of various industries indispensable ways of positioning products and solutions to their customers and provides the potential to improve win rates even in a difficult economic environment. The system and method also provides a tool to evaluate different technology options measured against the challenges of cost optimization, revenue growth and competitive threats. The system and method also provides a technique that outlines a methodology that combines qualitative and quantitative analysis with domain specific information to arrive at value provided by new investments. The benefit of using this tool and methodology of the invention may be large in terms of percentage saved in costs and time of discovering, developing and launching new products such as drugs, consumer products, commercial products or the like.

An exemplary system and method of the invention is described herein directed to the pharmaceutical/life sciences industry, although the system and method should not be limited to such an application. The system and method is also applicable to nearly any commercial or consumer product business environment or industry, including service industries, as one or ordinary skill in the art should recognize. Thus, the system and method of the invention should not be limited to any one business environment.

The system and method may be viewed for explanation purposes as two stages or phases: development and execution. In the development phase there are several steps that include, for example, in no specific order for any industry and, for illustrative purposes, to the pharmaceutical industry:

i) Identify the business objectives of the pharmaceutical industry;
ii) Identify the categories of the solutions;
iii) Identify a value matrix by having initiatives at each intersection of the business objective and the solution category. There may be many initiatives in a matrix cell. It is also possible for an initiative to have sub-initiatives depending on the level of granularity desired by the business case;
iv) Identify the technology solutions that correspond to the initiative through sub-initiatives and capabilities; there may be many solutions to satisfy an initiative. Establish the link between the technology solution and a business objective through the capabilities and initiatives;
v) Identify the costs and benefits of the solution associated with the initiative and perform best practices research and identify the best values for the costs and benefits (usually percentage improvements);
vi) Develop a financial calculator that calculates the ROI, TCO, IRR, PP for the solutions identified with the initiatives in the value matrix. Note that the connections of the ROI for the technology solution is connected transparently to the business objectives; and/or
vii) Continuously enhance the value matrix and the financial calculator as new solutions are identified. For example, if electronic medical records (EMR) technology becomes common place in conducting trials, an initiative may be added in the value matrix and the EMR solution may be to the financial calculator.

The execution stage of the system and method occurs when an occasion to present alternatives arises. These occasions may include, for example, when a customer is approached and one or more of several situations arise:

i) The customer knows the technology solution that is desired, for example electronic data capture, and, in this case, the ROI sheet is customized with cost benefit and customer confidence levels to best practices numbers as shown in the ROI calculator example below;
ii) The customer wants to improve the business objective, for example cost reduction. In this case, all the process, people and technology initiatives may be presented and made available, for example EDC, collaboration among scientists, etc., perhaps customizing the solution and deliver that solution; and/or
iii) The customer wants a customized solution which may be different than the ones identified in the value matrix, for example the use of Electronic Medical Records (EMR) in clinical trials. This may result in combining the initiatives and solutions to deliver the combined objective of value and all solutions that might be applicable or developing a totally new solution. The new solution may then be added to the value matrix and making it available for future use.

By the repeated use of the model provided by the system and method, the solution may become richer and richer, in terms of possible alternatives.

The ROI sales tool provided by the system and method builds a cost-justification business case and can be customized for a specific client in a short time for a client's specific goals and recommended solutions in as short duration, typically two weeks up to two months depending on the complexity of the client situation.

Figure 1:
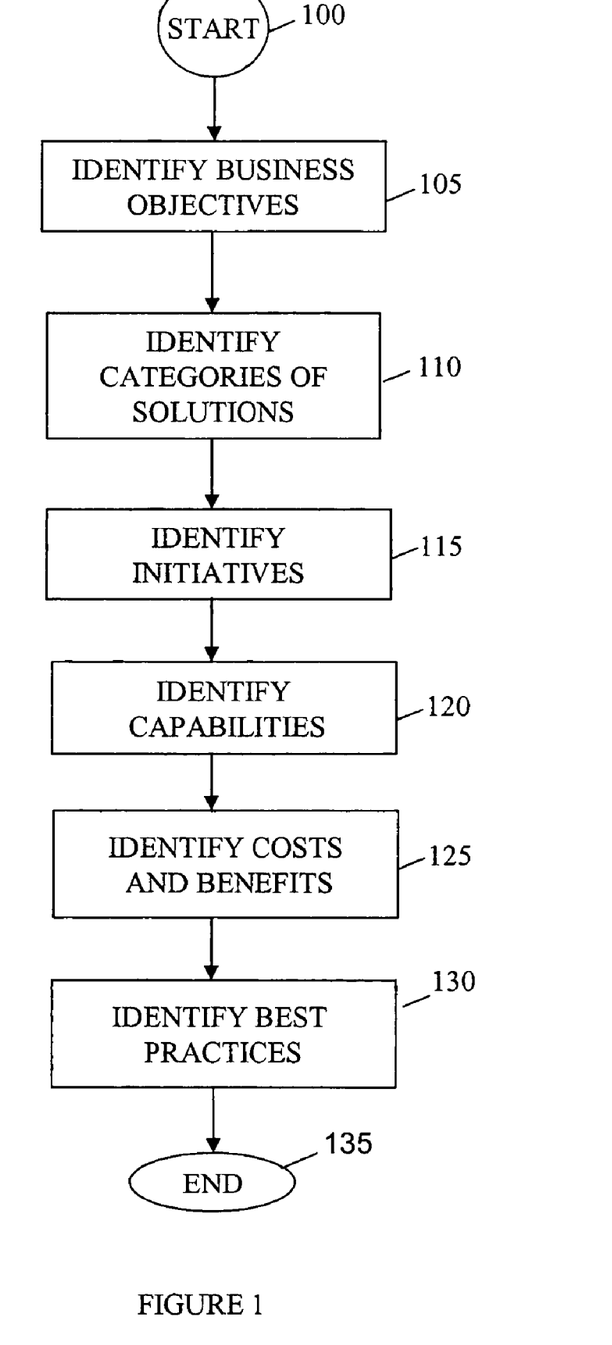
FIG. 1 is a flow diagram of an embodiment showing steps of using the invention.

FIG. 1 is a flow diagram showing steps of an embodiment of the invention, starting at step 100. FIG. 1 (and all of the other flow diagrams) may equally represent a high-level block diagram of components of the invention implementing the steps thereof. The steps of FIG. 1 (and all of the other flow diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

At step 105, business objectives of a customer or application may be identified according to a business goal. These business objectives may be identified after a detailed analysis of pain points (significant business issues) through research, interactions with customers, subject matter experts and issues of different clients across the industry. For example, pharmaceutical companies typically have various main objectives or goals that determine the success of a pharmaceutical company. Given the nature of the industry, many decisions in the pharmaceutical industry are taken to meet one or more objectives. These objectives may include the following, for example:

Create an innovative environment

An innovative environment harbors the potential to discover and develop drugs to the market place before competition. In this industry it has been found that doctors seldom change the medicines that are working for a patient. Subsequent drugs face substantial scrutiny and their chances of being blockbusters are diminished. Value creation through original and innovative work in the area of drug discovery is typically a key driver of business for most pharmaceutical companies. The pharmaceutical companies strive to achieve creative and efficient solutions through productive utilization of their resources.

Improve probability of success for drugs

The pharmaceutical industry may be the only industry where large numbers of compounds are typically researched to get one blockbuster drug. The cost of discovery and development may often be more than $800 million per compound, with more than two third of the cost attributed to failure (i.e., where the drug is found to be toxic or not useable in humans). Even after a drug is introduced, less than one-third of the drugs that make it to the marketplace recover their research and development costs. The cost of drug development increases dramatically as the testing goes downstream. Technology solutions that might identify failure faster are very much desired by the industry.

Reduce time of discovery and development

On an average, it takes 12 to 15 years to bring a new medicine to the marketplace. The best practices indicate that one day of delay costs $40,000 and an opportunity cost of more than $1.2 Million (based on the generally known blockbuster model). This it is very critical for the pharmaceutical companies to work diligently on reducing lead times and improve efficiencies to bring new drugs into the market soon. Solutions that help in the reduction of lead times obtain much attention from the Life Sciences companies. Some solutions in the areas of Genomics, Proteomics, and High Throughput Screening technologies have generated tremendous excitement and are increasingly being used in the Life Sciences industry.

Reduce cost and improve efficiency

U.S. research-based pharmaceutical companies invested more than $26 billion in 2000 to discover and develop new medicines, a 10.1 percent increase over 1999. U.S. research pharmaceutical companies invest a higher percentage of sales in research and development (R&D) than any other industry, including electronics and aerospace.

Improve revenues and effectiveness

In an increasingly competitive market, Life Sciences companies want to capitalize on any opportunities to generate more revenue and increase effectiveness of their Sales and Marketing. After investing huge amounts of money in the Research and Development efforts of drugs, the Life Sciences companies want to employ innovative ways to improve their revenues. Any solutions that directly or indirectly impact revenue catch the attention of the companies.

Build organization image

The executives in the industry often want to be perceived that they are in the business of providing "cures" to sick people and not a money making organization. To this end, the executives may emphasize corporate citizenship programs, customer and consumer education programs. Pharmaceutical manufacturers are often looking at innovative ways to build brand and customer loyalty. At the same time, while the pharmaceutical companies may be focusing on building an organizational image for social accountability and disease eradication, their business objectives usually drive them toward improving their overall profitability. Many technology solutions that help organizations improve their image have been found to be linked to the loyalty in the organization.

These business objectives may be connected to the capabilities provided by vendor solutions which might be based on technology, process, people, science, or the like typically through concrete initiatives. Initiatives define capabilities such as, for example, process reengineering or application integration. A technology solution may be connected to the capability directly and to the business objectives indirectly. There may be multiple many-to-many relationships that are possible and customization of these, along with a customer's involvement builds credible value propositions.

Continuing with FIG. 1, at step 110, at least four categories of solutions may be identified, according to the invention. The following illustrates the exemplary categories for the pharmaceutical industry along with solutions for the categories. These categories and solutions include:

Science or Applications

The science or applications category addresses the thousands of application that are used by the industry to solve various aspects of drug discovery and development. The range of applications might be from genomic, proteomic, high throughput screening to those that help document the process for a non-disclosure agreement (NDA) to the Food and drug administrative agency to get an approval.

Process

This category identifies the ways in which the current processes could be streamlined and/or reengineered to improve efficiency and effectiveness. The main sections in this area are related to eliminating redundant activities as savings on cost, to performing activities in parallel and saving on time, to automating the activities and reducing the error (or improving quality of leads and targets) to identifying and eliminating bottlenecks which improves the throughput to do more with less resources.

People

The pharmaceutical industry again needs to rely on a diverse set of people to work in synchronization to complete the project. There are biologists, chemists, doctors, project managers, clinicians, pharmacogenomics, etc. to bring a drug to market. Solutions that promote collaboration among scientists can expedite the process and reduce costs as many parallel efforts may be eliminated. Employing a wide variety of skills in improving communication and collaboration among these diverse groups of people is very important.

Technology

The use of technology in the drug industry may be unparalleled with any another industry. For example, from mapping the genome to developing the Blue Gene project. Technology is used throughout the process to answer nearly any question. Infrastructure related costs of the Information technology (IT) are becoming increasingly important for Life Sciences R&D. Life Sciences companies are achieving increased research efficiency by the introduction of new approaches to the design, synthesis, screening and optimization of drug candidates. IT is an important support function for all of those activities and there are certain functions and operations that cannot be performed without IT. As a result of this, many IT solutions are increasingly becoming mission critical in the drug discovery and development process.

Continuing with FIG. 1, at step 115, the initiatives that are at the intersection of the objectives and solution categories may be identified. The overall ROI framework analyses the areas of capabilities and offerings across each objective and presents the solution areas in form a value matrix.

FIG. 2 is an exemplary illustration of a value matrix. Referring to FIG. 2, the horizontal axis denotes objectives and the vertical axis denotes capabilities. The solutions that are offered have capabilities to resolve problems of exemplary Life Sciences type companies in most cross sectional areas of objectives and capabilities. These solutions have been mapped on the value matrix to keep focus on the value that may be provided to a client. The value matrix provides a mapping of initiatives for connecting the solutions to objectives transparently. In the example of FIG. 2, twenty-four initiatives are shown.

Based on the six objectives and four dimensions of capabilities as shown in FIG. 2 (also known as "Objectives and capabilities matrix for Life Sciences ROI"), specific areas for improvement for any problem in the Drug Discovery and Development Cycle may be identified as outlined. These areas may be benchmarked internally and externally with best practices to attain higher levels of customer satisfaction. This focused approach to resolve client problems may be targeted to improve the overall profitability of the organization.

The twenty four initiatives of FIG. 2 are identified by reference numerals 1-24. These initiatives are described in detail below:

1. Identify validated targets and optimized leads faster by using genomics or proteomics; high throughput screening; or electronic data capture technologies early in the discovery process. The idea is to improve the productivity of biologists and chemists by providing integrated tools and platforms that reduces discovery or development time.
2. Streamline the discovery and development process by eliminating the bottlenecks owing to the unevenness of efficiency gains at different steps in the value chain and ensure predictable throughput. The areas which need special attention are between: (a) target validation and lead optimization by passing only optimal number of validated targets; (b) late discovery and early development by reducing the number of Phase 1 development rejects; and (c) commercial and discovery and reduce chances of failure.
3. Enhance the speed of discovery and development by promoting collaboration across the various players in the discovery and development value chain that introduces delays. Improving the coordination and communications between the biologists and chemists and between discovery scientists and development managers by introducing regular cross-disciplinary work group activities and regular feedback.
4. Reduce the lead time by optimally implementing informatics solutions such as data integration, decision support systems, "in silico" models and interdisciplinary applications. Speed may be accelerated by (a) integrating the diverse data sources to reduce the time spent on searching, coordinating and making use of data, (b) integrating data handling procedures and reduce time spent in checking and correcting errors, (c) immediate access to information across corporate boundaries through flexible IT environments and using text and data mining solutions.
5. Improve the likelihood of success by identifying "quality" targets (targets with a higher probability of success) and finding "druggable" compounds through improved methods of screening, identification and validation. Use bioinformatics tools such as, for example, pharmacogenomics, protein separation and mass spectrometry, protein arrays, metabolic pathways, gene regulatory networks, model organisms and cellular arrays. Use therapeutic relevance early in the process through structure-based drug design, docking and "in silico" design, Pre ADME/Toxicology methods, virtual screening and cheminformatics.
6. Incorporating an iterative process where feedback from later stages is fed to the earlier stages of drug discovery and development improves the likelihood of success by promoting early attrition of compounds that do not have the potential of becoming successful drugs. Use of techniques such as breaking the larger process steps into smaller steps, quality metrics and automating manual steps help in identifying errors early in the cycle. Providing internet-based connectivity between the all the players and promoting collaboration will help in failing early and failing fast.
7. Establishing strong, multi-disciplinary teams in discovery and development helps in early attrition of potentially unsuccessful candidates by providing focus, flexibility and coordination. Attracting "flexible" people (biochemists), creating a performance oriented culture and continuously revisiting the desired skill-mix will improve the probability of success.
8. High performance computing and using "in silico" experimentation and simulation technology proactively identifies the errors that are found later in the process at a large cost. Simulation technology which provides a dynamic model requires fast and high power computers with massive storage capability. Using "in silico" (a) simulation of human organs is less expensive and faster than performing the in-vivo and in-vitro tests, (b) that mine data from federated sources to validate targets and (c) pathway simulation which involves integrating information from a variety of data sources leads to targets and leads of better quality.
9. Provide an innovative environment that is flexible enough to adapt to the constantly changing areas and methods of research and development to retain talent and increase successes. To accomplish long term successes balance the need for a focused, capable and motivated to deliver organization with being a responsible member of the global community. Strengthening "talent" pipeline by establishing strong pay for performance culture will support the business objectives of the organization.
10. Enhancing the process of knowledge capture and dissemination across the organization promotes innovation and encourages creativity in the organization. Knowledge management improves the efficiency by allowing people to manage work and projects, promote standards and reusability and expedites decision making in the organization.
11. Motivating people by providing incentives based on original work, patents, innovation and knowledge sharing will improve the productivity of the organization. Forming external alliances and partnerships helps scientists in accessing critical capabilities in a timely and cost-effective manner. Developing management tools and measures to find people effectiveness while ensuring greater alignment of individual and organization goals is critical to survive in this risky environment.
12. Technology that is open, flexible, extensible and standards-based improves the efficiency of the scientists and promotes discovery for new drugs and treatments. Portals can be used to tailor views to research data and create processes that link the different phases of development reduces the decision time and expedites discovery.
13. Reduce the cost of discovery and development by obtaining economies of scale through consolidation, by outsourcing non-value-added activities and by forming alliances. Larger organizations can attenuate risk through effective portfolio management. Develop resource planning and optimization an application that ensures that costly delays are avoided and total cost optimization happens early in the process.

14. Reengineering the existing process by process mapping and simulations reduces the overall cost of drug discovery and development by eliminating duplicate tasks, automating repetitive tasks performing activities in parallel. Use workflow techniques streamline the process and make it efficient and effective.

15. Improving the productivity of scientists and clinical trial managers though decision support systems reduces the time to discover drugs which in turn reduce the costs of new drug discovery. Changing where you deliver information, how you deliver information and what you deliver can have a significant impact on performance and cost reduction.

16. Reduce IT infrastructure and maintenance costs by making a one-time investment in developing a layered architecture to make future additions faster and cheaper. Promote data, applications, middleware and hardware's interdependencies and interoperability across the organization to promote reuse and cost reduction. Develop application architecture to ensure that maintenance and enhancements are globally consistent and reduce costs of technology implementation.

17. Improve revenues by developing a risk-balanced portfolio of products in the pipeline. Provide capabilities to monitor and manage the pipeline to accommodate the changing needs of the marketplace. Use segmentation criteria for prioritizing targets and compounds against therapeutic need, convenience, competitive position and economic objectives. Improve profitability by balancing the strategic considerations such as risk and reward with operational considerations of current projects and capabilities.

18. Develop processes to improve the communications with external partners to strengthen pipeline of products. Perform due diligence on merger and acquisition by critically evaluating the financial impact of the combined company based on realistic projections and improve the revenue position. Licensing compounds developed by research organization reduces the lead time and strengthens the portfolio.

19. Provide tools that improve the productivity of scientists who have the greatest impact on the revenues of the organization. Develop management processes to ensure that the interface between research and commercial is strong and focused on growth.

20. Improve profitability by creating new value from the appropriate use of technology and obtaining competitive advantage enjoyed by market leaders. To improve profitability make IT a business-driven activity and not a technology-driven staff function. Drive simplicity and flexibility throughout the technology environment by establishing and enforcing standards.

21. Image is very important in pharmaceutical industry to attract talent who in-turn is responsible for introducing block-busters into the marketplace. Improve image by (a) offering drug discount programs for low income elderly patients and earn the goodwill of the community and eventual buyers of the products; (b) developing programs for prevention, diagnosis and treatment for under privileged people and countries; and (c) through corporate citizenship programs.

22. Reengineer the processes of the company to become customer-focused and develop formal interfaces with insurers, hospitals, physicians, customers and suppliers. Develop programs with concrete initiatives to improve the communications and increase involvement.

23. Improve the image of the organization by identifying, attracting and retaining those rare individuals who have true insight—the ability to integrate information from many different sources and use it to approach a problem in a totally new way. Cultivate and leverage a reputation for innovation to attract top scientists. Develop a hybrid model by balancing therapeutic area focus, functional competence and process excellence.

24. Providing state-of-the-art technology improves the image of the organization and attracts successful candidates. Develop technology for: (a) gene therapy to cure diseases at the root, (b) genomics to increase the number of drug alternatives that are available, (c) xenotransplantation to account for donor shortages, (d) nanotechnology to target and remove diseased tissue etc. and project an image of technology leaders among competition.

Continuing with FIG. 1, at step 120, capabilities required for the initiative and the solutions may be identified. For example, the initiative to reduce the time and cost of clinical trial at the intersection of the "reduce DD&D lead time" objective and "science/application" category of the value matrix could be a business objective for a pharmaceutical enterprise. Several solutions may be connected to this objective which might range from the incorporation of electronic data capture to reengineering the entire process to a drastic solution such as outsourcing the entire process to a different country. The details for the four sub-initiatives associated with "initiative 1" of FIG. 2 (and similarly for other initiatives, as appropriate) may include the following as shown by Table 1:

TABLE 1

| Sub Number | Sub initiative | Capability | Solution |
|---|---|---|---|
| 1 | Improve data collection process | Use business transformation methodology to identify the bottlenecks, inefficient activities and underutilized resources. | Use IBM middleware application WBI-Modeler and reengineer the processes by mapping the "as is" situation and identifying the bottlenecks and providing solutions to them |
| 2 | Implement the EDC application | Change the process of data collection from paper to EDC | Implement the Medidata, Phase-forward or eRT based application and move from paper collection to electronic data collection |
| 3 | Improve clinical trial management system | Use the automated system to manage the clinical trials | Implement the Wincester (vendor) Clinical trial management system and integrate the application with back end process |
| 4 | Outsource the clinical trials to a clinical | Manage the outsourcing of the trials | Implement the IBM-Quintiles developed CTO solution and outsource the data portion of the data collection |

Each of the sub-initiatives (1-4) of Table 1 also identifies what capability may be required to accomplish the sub-initiative. For example, the implement EDC sub-initiative (i.e., number 2) requires the capability to move data collection from paper-based case report form to an electronic case report form. The solution that facilitates the development of eCRF is an application developed by vendors such as Medidata, Phase Forward and eRT. Note that the EDC technology solution is connected to the business objective of reduction of lead time through the implementation of EDC technology implementation.

At step 125, the cost and benefits of each solution may be identified. Both the tangible and intangible costs and benefits associated with each of the solutions may be identified. An example for the EDC solution (sub-initiative 2 of Table 1) for implementing the Medidata solution is shown by Table 2.

TABLE 2

| | COST | | BENEFIT | |
|---|---|---|---|---|
| | Tangible | Intangible | Tangible | Intangible |
| One-time | Hardware Software Training, Knowledge Transfer | Time value of customer staff, opportunity cost of replacing hardware, software etc. | Reduction in people, floor space, paper, value of discounts offered in hardware and software | Value of warranty; Value of organized knowledge transfer |
| On Going | Consulting, Call center User training Operational costs such as data validation, query resolution, monitoring and trail start-up and closing | System administration costs, self training for end users, peer support, end user hidden costs | Reduction in cycle time; Reduction in number of errors; Reduction in accessing stored information, reduced cost of double data entry, reduced cost of monitoring and support | Improved investigator satisfaction, simplified maintenance, utilization of resources, cross-silo collaboration |

A similar cost benefit valuation may be performed for all solutions of the value matrix and these results may be mapped into a financial calculator (e.g., a spreadsheet or the like). The kinds of cost benefit values for the quadrants of Table 2 include, for example:

One-time Costs
  The tangible portion of these costs are related to the procurement of hardware, software, etc., that may be required to implement the solution. The intangible costs are typically related to the opportunity costs associated with loss of time of personnel. One time costs that are typically incurred when the solution is developed and include the cost of hardware and software etc., whereas the tangible ongoing costs are costs related to loss of productivity and training of people.
On Going Costs
  The tangible portion of these costs is related to expenses such as maintenance of software, training for end users, warrant costs etc. The intangible portion of these costs include the opportunity costs associated with the activities.
One Time Benefits
  These benefits are related to the savings are related to reduction in the number of people or expanding the bandwidth for more trials. One time depreciation costs are also included in this section of the costs and the benefits.
Ongoing Benefits
  These benefits are related to the savings in cost of operation, reduction of lead time to complete an activity and reduction in the number of errors in data collection and improvement in quality of the data received.

There may be some level of subjectivity that is likely involved in the way costs and benefits are classified as tangible and intangible. Also, this may be customized for a specific situation and the solution every time the system and method of the invention is used.

At step 130, best practices numbers may be identified for developing a calculated benefit for one or more proposed solutions. The source of information for obtaining this going-in position may be obtained from publications or through the knowledge of the subject matter from experts in the area. These best practice parameters and numbers may be customized and applied for the pharmaceutical company by either having a confidence interval on the values (for example 80% of the value, or the like) or by providing user defined numbers and replacing the best value for this situation. An example of applying the best practice numbers is shown in Table 3.

TABLE 3

| Criteria | Paper Data Collection | Electronic Data Collection |
|---|---|---|
| Query cycle time in days | 5-14 days | 3-8 days |
| Queries from Sponsor | 90% | 10% |
| Automated queries | 0% | 60% |
| Cost of query resolution | $60 | $10 |
| Number of queries/patient | 5-20 | 0.5-1 |
| Number of queries/page | 1 | 0.5 |
| Invalid subjects | 15% | 7.5% |

A financial calculator (e.g., a spreadsheet), known generally as a ROI calculator, is also provided by the system and method and develops and initializes a worksheet for each objective. The financial calculator estimates the values for return on investment (ROI), total cost of ownership (TCO), internal rate of return (IRR) and payback period (PP) based on hard and soft costs and benefits by identifying the associated costs and benefits. The financial calculator may be populated by best practice numbers which may be customized by defining confidence intervals or before and after experiments.

Inside each worksheet the categories of solutions may be documented. Within each category and solution the costs and benefits may also be highlighted. The spreadsheet allows for modification/customization to fit user requirements. Several "what if" scenarios may also be documented by the user of the calculator for various input responses or combinations. These scenarios, for example, might range from implanting the EDC solution as a consulting opportunity to providing EDC service and charging based on the number of people or fixed monthly costs or a combination of the two. These numbers along with the costs and benefits identified may be entered in the calculator for each combination of solutions, i.e., each scenario. For each identified scenario, scenario a projection on cost/benefits may be performed. The process ends at step 135.

Illustratively, Table 4 shows possible financial calculations for four exemplary scenarios. The first scenario is where the EDC solution is implemented as a consulting engagement, the second scenario is where the EDC solution is provided as a service at a fixed of $2000 per patient per month, the third scenario is where the EDC is provided as a variable cost solution based on number of patients and the fourth scenario is where EDC is provided as a service with some fixed cost for a trial and some variable cost based on the number of patients. Each identified scenario (e.g., a scenario being any combination of objectives and initiatives) which may include return on investment (ROI), total cost of ownership (TCO), net present value (NPV), internal rate of return (IRR) and pay back period. Essentially, any financial calculation may be computed.

TABLE 4

|  | ROI | TCO | NPV | IRR | Payback period |
|---|---|---|---|---|---|
| Scenario 1 | 138% | $2,340,000 | $3,000,000 | "a large value" | <one year |
| Scenario 2 | 298% | $195,400 | $5,339,000 | "a large value" | <one year |
| Scenario 3 | 263% | $2,143,000 | $5,171,000 | "a large value" | <one year |
| Scenario 4 | 51% | $5,169,000 | $2,479,000 | "a large value" | <one year |

For example, the ROI based selling approach outlines quantitative and qualitative costs, tangible and intangible benefits, ROI, NPV, IRR, payback calculations and risk assessment of a new investment. In this manner, the system and method may demonstrate to clients for presenting alternatives and opportunities interactively, perhaps at the time of a sale. The initial values for all the financial parameters may be demonstrated based on industry's best numbers. This approach may help clients understand the overall value picture of any particular solution being offered as well as benchmark a performance against the industry best practices, perhaps also against internal achievements.

The value matrix forms the basis for an ROI calculator that quantifies the costs and benefits of implementing solutions. This system and method may be flexibly used for estimating the feasibility of implementing a new solution for improving drug research and development efforts, for example. An ROI analysis may be performed for any specific solution or offering at a specific client location and for a specific application. The ROI calculator may also include a financial analysis of other parameters such as IRR, NPV and Payback Period.

The benefits and costs may be quantified using this model in a relatively short time using a customer's basic information. The model may compare the customer information against the industry best numbers and may provide the potential incremental benefits using solutions. The industry best practice numbers may be taken from different sources and optionally mentioned or highlighted in the calculator's printouts.

EXAMPLE OF USING THE INVENTION

The ROI calculator of the system and method of the invention provides a starting point for further analysis of client's problems, issues and potential improvement areas. Based on an initial analysis using the model, sales people might estimate an approximate value for returns on client's investments in various solutions. To briefly understand how the ROI calculator works, exemplary situations are illustrated below, with an associated business case developed.

Exemplary Business Situation and Solution Description

For illustration purposes, assume the customer is a large pharmaceutical company and conducts more than one hundred clinical trials every year to test drugs in the pipeline for efficacy and safety. The process involves identifying doctors to conduct the trial and patients that have the symptoms the proposed medicine under development is supposed to cure to participate. The patients consume the medicine and reports to the doctor who communicated the impact on safety and efficacy through a paper case report form (CRF). This CRF data is entered into the computer manually and statistical analysis is done to identify the impact of the drug. This process is heavily regulated and all items have to be checked are verified to ensure that protocol was being adhered to during the trial. The paper process is serial with several handoffs and substantial amount of time is wasted in people waiting for work to arrive. Also, this manual process may cause errors in the clinical data and expensive delays happen in correcting the errors which results in extending the trial.

The technology solution of electronic data capture (EDC) which is provided by several vendors with a computer-based CRF with automatic edit-checks to improve the quality of input data at the source. The communication of the data is electronic and instantaneous. Automatic checks are performed on the data and errors are communicated by email. The various people who review the data can do so in parallel thereby reducing the time. The elimination of transportation, duplicate data entry, errors and elimination of redundant activities results in reducing the cost and time to conduct the trial. The following illustrates several exemplary cases for demonstrating the use of this invention to address these problems; alternatively, for generating a value proposition for an EDC solution depending on the situation at hand.

Case 1: One Objective, One Initiative and One Solution:

The customer knows about the EDC solution and asks the vendor to provide the ROI for implementing the solution. The execution of the model of the system and method of the invention begins by identifying the customer objectives of reducing cost, followed by the initiative to implement the EDC solution. The assumptions on the industry averages used in the model are then validated by the customer and the changes are incorporated into the spreadsheet calculator. A lead time reduction sheet may be populated by the costs and the benefits identified for this solution and the ROI may then be calculated. The ROI numbers may be connected to the lead time reduction objective and thus a business value is calculated for a technology solution.

The results from the calculator show that an investment of $3 million yields a ROI of 138% with the total cost of ownership of $2.34 million and customer payback in less than a year. The lead time reduction with the EDC experiment was close to half the normal process. The magnitude of the gain improves as more and more clinical trials are converted to EDC.

Case 2: One Objective, Multiple Initiatives and the First Phases of Multiple Solutions:

The customer has a desire to reduce cost but instead of doing one deep dive into the full blown EDC solution the customer wants to try several smaller initiatives. The customer in this case may reduce costs by streamlining the paper data collection process, by promoting collaboration between scientists and by integrating the backend applications for data capture and processing.

The results from the calculator show that the same investment of $3 million will yield a ROI of 168% and again in this case the customer may expect to get the payback in less than a year. The time and cost of conducting the trials may be reduced by improving the efficiency and effectiveness of the people.

Case 3: Multiple Objectives and One Initiative and One Solution:

The customer wants to reduce the costs and time of conducting the trials simultaneously by using the EDC solution and improving the effectiveness of employees by providing the decision support systems. The solution in this case is to implement the EDC solution and also provide a decision support system and reduce the number of people involved in the trials.

The results from the calculator (where we need to populate two objectives of cost and time) shows that an investment of approximately $5 million yields a ROI of more than 200% and the customer can expect to get the payback in approximately 1.2 years. The cost reduction is a result of the EDC solution and the time reduction is a result of improving the effectiveness of the people involved in the trial.

Case 4: Multiple Objectives and Multiple Initiative and Multiple Solutions:

The customer wants to transform the entire clinical trial management process and has several objectives and several initiatives. The customer is interested in reducing the time to conduct the trials, reduce the costs, improve the probability of success and enhance the image of the organization at the same time. The solution in this case is a complete transformation of the process and implementation of EDC and clinical trial management system (CTMS), investigator relationship management systems (IRTM) along with promoting the collaboration between the scientists in discovery and development.

The cost benefits may be derived from the implementation of EDC, CTMS and IRTM systems, the time to conduct the trials will be reduced by streamlining the process and eliminating the redundant activities, the probability of success may be improved by promoting collaboration between the discovery and development scientists.

As illustrated by the examples, in real world, there is no one to one correspondence between the business objectives and the technology solutions and a many-to-many relationship exists. The tool of the system and method has the flexibility to accommodate any kind of mix and match to arrive at a business case. The tool may be used to perform "what if" analysis on available options and help the senior management in their decision making. Solutions could be built incrementally and each time only those features are included that add the value based on budget constraints of the organization.

Iterative Enhancements

Every time a new solution is identified and brought into the vendor portfolio or a custom solution is generalized into an offering, the solution may be added to the model and the database associated with the calculator. That is, the appropriate box in the value matrix and the cost and benefit entries must be imported into the spreadsheet. Thus, the calculator tool becomes richer.

Every time the tool is customized to a business problem, the results are feedback to the model to calculate new averages which enhances the value of the best practice numbers used in the model. The calculator tool collects the benchmarking information which makes development of subsequent value propositions simpler. Moreover, the spreadsheet may be used to show only the desired fields while hiding unwanted numbers.

The system and method is thus easy to use and can be customized to every sales situation quickly.

Customers' preferences are moving more towards purchasing solutions and not products which makes selling based on function, feature and price alone somewhat obsolete. Vendors often need to demonstrate a solid business case for the value provided by the technology solution. The innovation of the system and method provides an approach to using domain and industry specific knowledge to develop a qualitative and quantitative business case. The use of the tool of the system and method in proposals and engagements typically improves the win-rates and reduces the sales cycle time simultaneously for the solutions.

Figure 3:
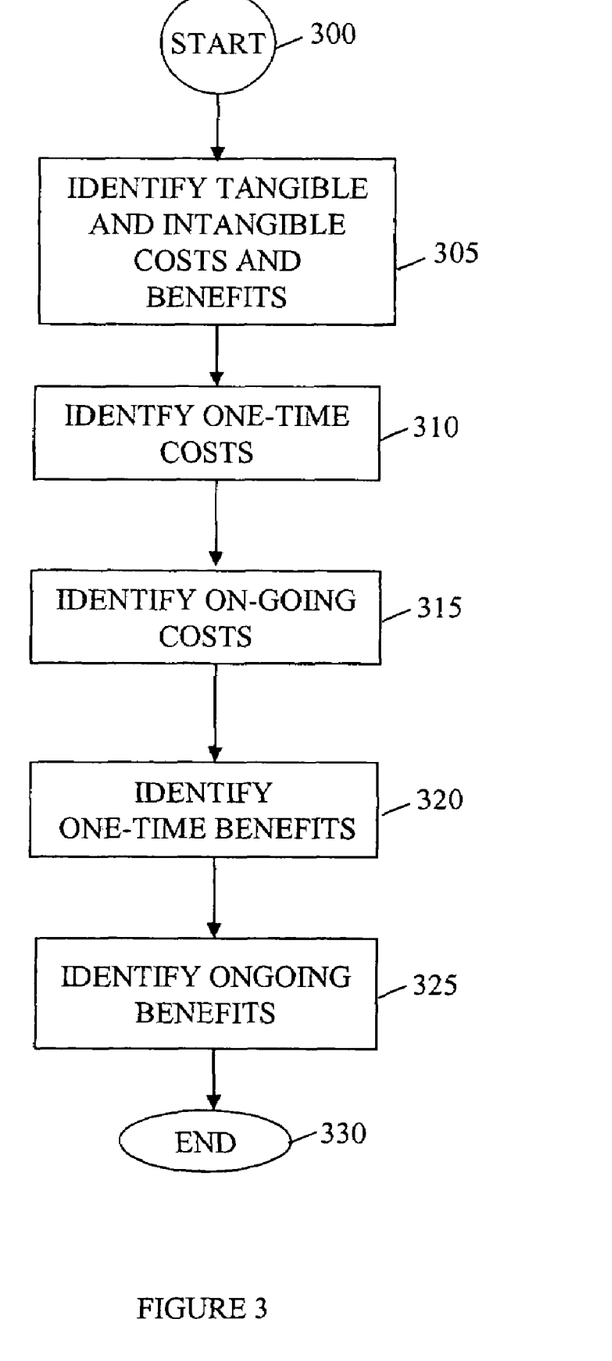
FIG. 3 is a flow diagram of an embodiment showing steps of using the invention.

FIG. 3 is a flow diagram of an embodiment showing steps of using the invention, starting at step 300. At step 305, tangible and intangible costs and benefits may be identified for one or more solutions of the value matrix. At step 310, one-time costs may be identified for the one or more solutions of the value matrix. At step 315, on-going costs may be identified for the one or more solutions of the value matrix. At step 320, one-time benefits may be identified. At step 325, ongoing benefits may be identified for the one or more solutions of the value matrix. At step 330, the process ends.

Figure 4A:
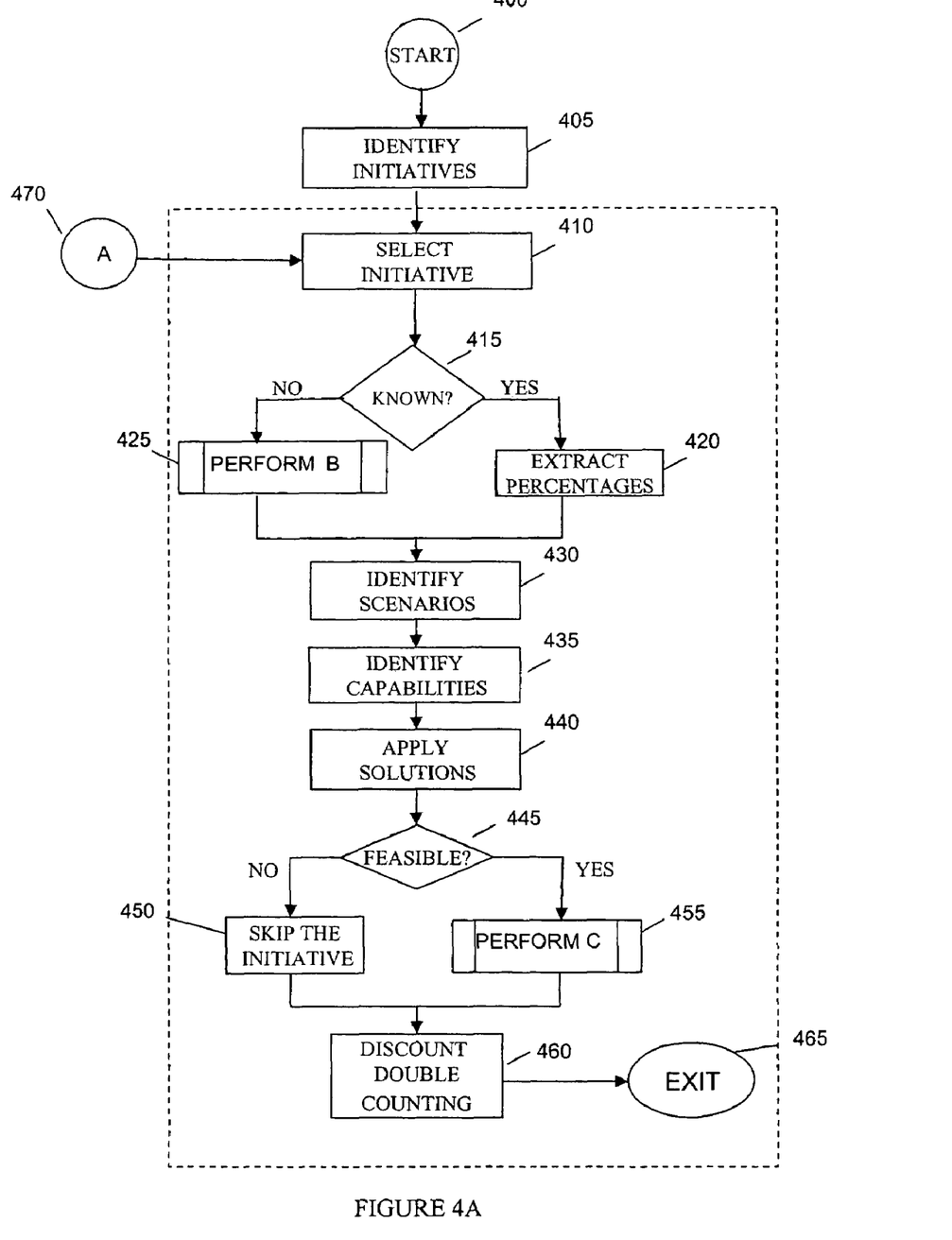
FIGS. 4A-4C are flow diagrams of embodiments showing steps of using the invention.

FIG. 4A is a flow diagram of an embodiment showing steps of using the invention, starting at step 400. Alternatively, the flow of FIG. 4A is shown with another possible entry and is explained in relation to FIG. 5. At step 405, one or more initiatives may be identified for possible solution to a business objective. At step 410, an initiative may be selected for possible business choice, according to the business goal. At step 415, a check is made whether the selected initiative is known. If not, the initiative is documented along with other associated information as described in relation to FIG. 4B below. The documentation steps of FIG. 4B are shown as a sub-process "B".

If the initiative is known, then at step 420, percentages may be extracted for the confidence levels of the values associated with the costs and benefits, according to, for example, user defined percentages or industry best practices which may be substituted for best value for an activity. At step 430, one or more scenarios may be identified which may involve changing one or more parameters (e.g., valuation, confidence level, and the like). At step 435, one or more capabilities may be identified for the initiative. At step 440, one or more solution may be selected and applied. At step 445, an executive decision or determination may be made as to whether the solution(s) applied is feasible or satisfactory. This may involve intangible considerations for the business.

If not deemed feasible, at step 450, the currently selected initiative may be skipped and processing continues with optional step 460. However, if the initiative is deemed feasible, then at step 455, sub-process "C" may be performed which involves several financial calculations, and is discussed in relation to FIG. 4C. At optional step 460, double counting of costs or benefits may be discounted to more accurately reflect a financial valuation, as necessary. At step 465, the process ends or returns to a controlling process, as appropriate.

Figure 4B:
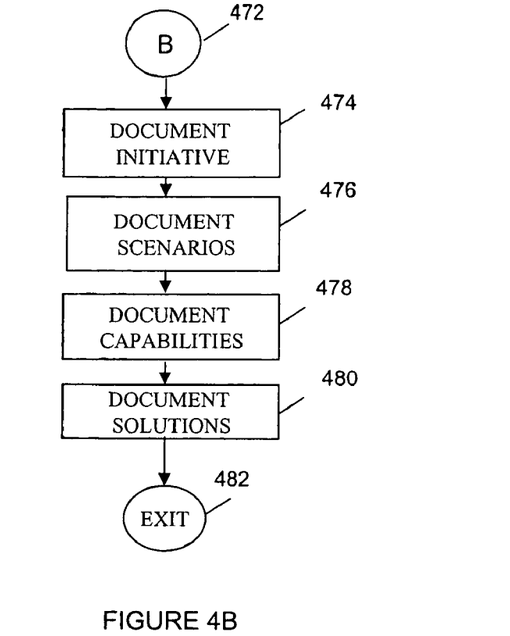

FIG. 4B is a flow diagram of an embodiment showing additional steps of the invention, starting at step 472. At step 474, a selected initiative may be documented to describe and capture the various aspects to define the initiative.

At step 476, one or more scenarios may be documented. A scenario may be an alternative use of the ROI methodology with different values of one or more the variables used in estimating the end results. Typically, scenarios may be differentiated and documented when there is a noticeable difference in understanding and estimation of the values of the variables used for deriving end results. At step 478, capabilities may be documented for the initiative. At step 480, one or more solutions may be documented.

Figure 4C:
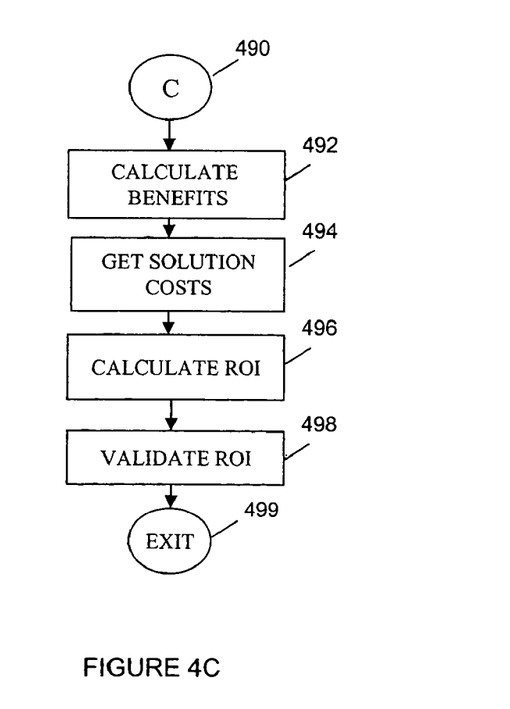

FIG. 4C is a flow diagram of an embodiment showing additional steps of the invention, starting at step 490. At step 492, the benefits of a proposed solution or solutions may be calculated to provide a benefit basis. At step 494, the costs of the one or more solutions may be calculated to provide a cost basis. At step 496, the ROI (and/or other measurements such as NPV or payback) may be calculated. At step 498, the ROI (or other measurements) may be validated to assure that the components contributing to the calculation are valid and further provides a basis to deem the one or more solutions acceptable according to a business threshold. At step 499, the process exits or returns to a controlling process, as appropriate.

Figure 5:
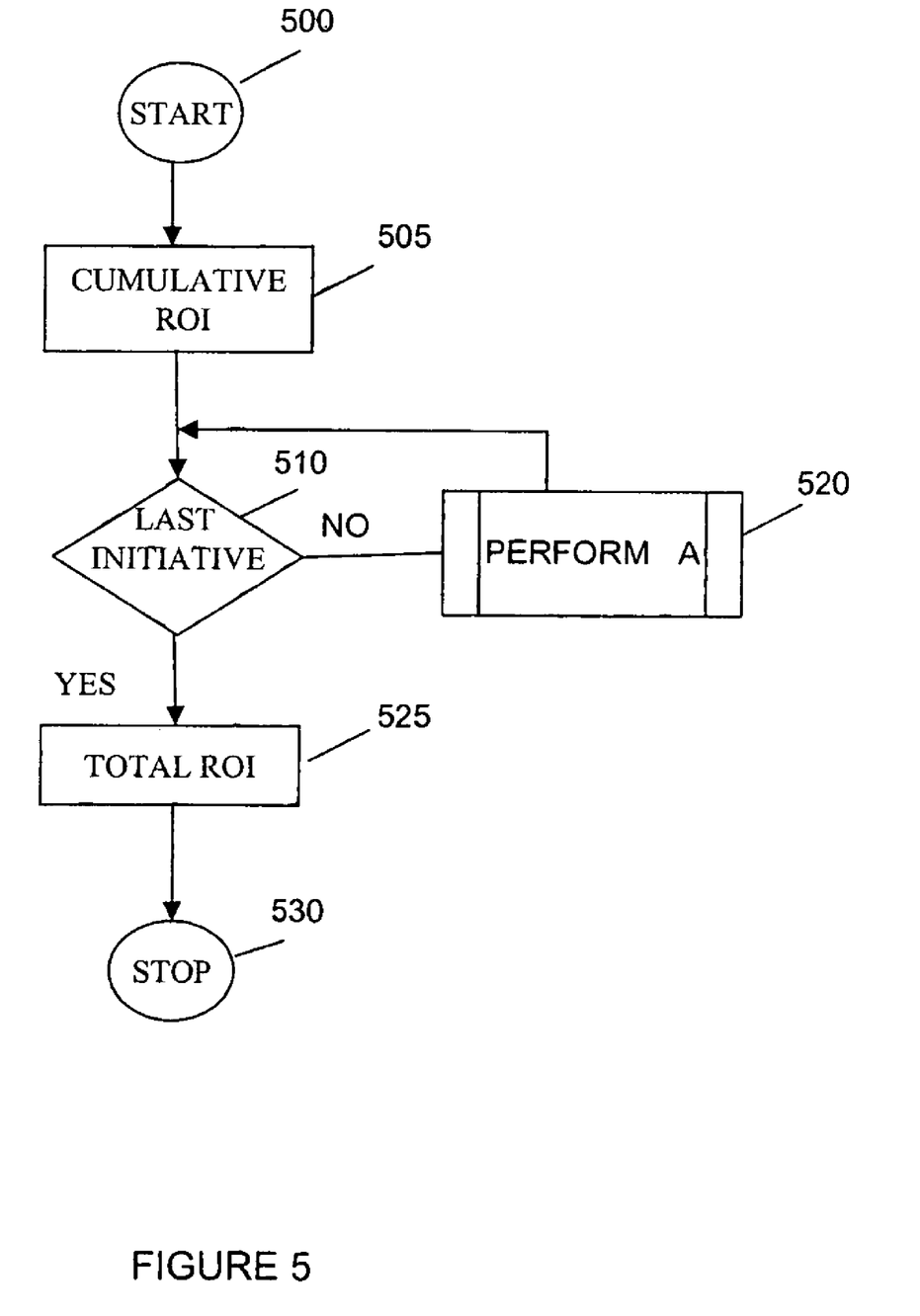
FIG. 5 is a flow diagram of an embodiment showing steps of using the invention.

FIG. 5 is a flow diagram of an embodiment showing steps of using the invention, starting at step 500. As described below, this embodiment may access the flow of FIG. 4A at entry point "A". At step 505, cumulative ROI is initiated to accumulate the ROI's from more than one desired initiative. This provides for iterative tallying of cost and benefits for a multi-faceted program comprising several initiatives. The process of FIG. 5 may also be used to compare multiple alternative programs to achieve a higher level view for executive decision making among several possible choices.

At step 510, a check is made if all desired initiatives have been processed. If not, at step 520, sub-process "A" may be performed, and when sub-processing "A" completes, processing continues at step 510. Otherwise, if the last desired initiative is completed, then at step 525, total ROI (or other total measurements such as NPV, TCO or payback, etc.) may be computed for the accumulated data produced by sub-process "A", from the multiple iterations. Form this accumulated data, an objected basis for comparisons and business decisions may be based for engaging any of the initiatives. At step 530, the process ends.

ROI Calculator Example

The following exemplary business case demonstrates the usefulness of the ROI calculator of the system and method of the invention. The exemplary business case includes the following defined parameters:

Problem at Hand:

Sub-Optimal costs incurred on document management in Drug Discovery and Development processes.

Mapping of this problem on the Value Matrix:

| | |
|---|---|
| Objective: | Cost Reduction |
| Capability: | Process |
| Customer Information | |
| Client Name: | ABC Inc |
| Geography: | North America |
| Primary Business Area: | Fully Integrated Pharma Company |
| Customer Annual Revenue: | $450 Million |
| Revenue directly associated with Solution | $1.12 Million |
| Client Discount Rate | 6% |
| Analysis Period Begins | Jul. 1, 2000 |
| Analysis Period Ends | Jul. 1, 2004 |
| Each Period comprises | 12 months |
| Expected Migration Date | Jul. 1, 2003 |
| Currency | US Dollar |
| Annual IT Budget | $22 Million |
| Average hourly cost of IT professionals | $65/Hr |
| Number of IT support personal | 155 |

| Solution Information | |
|---|---|
| Name of the solution | Electronic Data Capture (EDC) |
| Scope of the solution | Cost Optimization |

| -continued | |
|---|---|
| Solution Information | |
| Stage in SSM | Establish buying vision with customer |
| Main area of impact | Clinical Trials |
| Primary Solution Impact Area | Cost Reduction |
| Total cost of the solution | $2.952 Million |

Depending on the solution being recommended to the client, the ROI calculator uses the above basic information to further analyze with specific information under some or all of the objectives that include, for example: Lead times, Costs, Probability of success, Revenues, Environment or Image that are impacted by the solution. In case of the EDC solution, the business objectives impacted is cost reduction. Under this objective, the following information is gathered from the client:

| Cost Reduction | |
|---|---|
| Average number of Clinical Trials converted to EDC | 20 |
| Average number of patients required for Clinical Trials | 100 |
| Average number of pages in each CRF (Clinical Report Forms) | 100 |
| Average number of sites for data capture | 10 |
| Average number of queries per trial | 50 |
| Average number of hours for database lock | 320 |
| Average hourly cost of Clinical staff in USD | 50 |
| Average number of Clinical staff to support trials | 150 |
| Expected number of resources that will use the EDC system | 25 |
| Total annual cost of overheads (including telephone, fax, etc.) | 100,000 |
| Average annual cost of paper directly associated with Trials | 125,000 |
| Average annual of travel related to clinical trials | 75,000 |
| Based on the industry standards and solution capabilities, the ROI tool calculates the following values: | |
| Total cost of ownership | $7.34 M |
| ROI of using the CX Pharma Solution | 645% |
| NPV | $4.86 M |
| Payback Period | Less than a year |

The ROI calculator provides values for key parameters that help customers or users make their buying decisions or business decisions much quicker and more rationally. The results may be compared from the ROI calculator with industry best numbers as well as with solutions from other competitors.

As shown, the system and method of the invention provides for a quantification process for evaluating business decisions which may be employed by nearly any type of business in nearly any industry. Such industries as manufacturing, service, operations, communications, refining, or the like, may apply the system and method of the invention substantially as described herein.

While the invention has been described in terms of embodiments, those skilled in the art will recognize that the invention can be practiced with modifications and in the spirit and scope of the appended claims.

What is claimed is:

1. A method of deciding business alternatives, which is implemented on computer program code in combination with hardware comprising the steps of:

determining one or more objectives associated with a business using a processor;

determining one or more capabilities of the business using the processor;

analyzing at least one solution for one or more initiatives associated with the one or more objectives and the one or more capabilities using the processor;

generating a financial measurement, using the processor, based on results of the analyzing step which shows the contribution of the one or more initiatives to achieve the one or more objectives of the business; and associating at least a cost and/or benefit to the at least one solution for use by the generating step, wherein the benefit is calculated, using the processor, based on at least in part industry best practices.

2. The method of claim 1, wherein the cost is one of an on-going cost and a one-time cost.

3. The method of claim 1, wherein the benefit is one of one-time benefit and an on-going benefit.

4. The method of claim 1, further comprising the steps of:
identifying one or more categories for the at least one solution for use by the generating step, each of the one or more categories having an associated cost and a benefit; and
identifying one or more best practices having an associated cost for use by the generating step.

5. The method of claim 1, wherein the analyzing step applies a percentage of a best practice parameter to compute a ROI.

6. The method of claim 1, further comprising skipping the one or more initiative if the at least one solution associated with the initiative is deemed non-feasible.

7. The method of claim 1, further comprising computing a total ROI for a plurality of the one or more initiatives and associated at least one solution.

8. The method of claim 1, further comprising the steps of:
documenting the one or more initiatives;
documenting the one or more solutions;
documenting the one or more capabilities; and
documenting one or more scenarios.

9. The method of claim 1, wherein the generating step also generates at least any one of a return on investment (ROI), an internal rate of return (IRR), a payback period, a total cost of ownership, and a net present value (NPV).

10. The method of claim 1, further comprising benchmarking a performance against the industry best practices.

11. The method of claim 1, wherein the benefit comprises an ongoing benefit, which is configured to relate to savings in operation costs, reductions in lead time, reductions in number of errors in data collection, and improvements in data quality.

12. The method of claim 11, wherein the benefit is incremental.

13. A method of comparing business alternatives, which is implemented on computer program code in combination with hardware comprising the steps of:
creating a value matrix having one or more initiatives associated with objectives and capabilities using a processor;
associating one or more solutions to the one or more initiatives, using the processor, the one or more solutions having a cost and a benefit;
calculating a financial measurement, using the processor, based on a selected initiative of the value matrix providing an objective basis to deem the initiative feasible according to a business goal; and
relating the cost and/or the benefit to the at least one solution using the processor, wherein the benefit is calculated based on at least in part industry best practices.

14. The method of claim 13, wherein the financial measurement is any one of a net present value (NPV), a return on investment (ROI), a payback period, a total cost of ownership, and an internal rate of return (IRR).

15. The method of claim 13, further comprising establishing a cost basis and a benefit basis for each of the one or more solutions for using in computing the financial measurement.

16. The method of claim 15, wherein the cost basis includes ongoing costs and one-time costs and the benefit basis include ongoing benefits and one-time benefits.

17. The method of claim 15, further comprising the step of generating a total financial measurement based on a plurality of financial measurements from a plurality of the one or more solutions.

18. A system for comparing business alternatives, comprising:
means for creating a value matrix having one or more initiatives associated with objectives and capabilities;
means for associating one or more solutions having a cost and a benefit to the one or more initiatives;
means for quantifying a best practice associated with the one or more solutions;
means for calculating a financial measurement based on the one or more solutions derived from the value matrix and at least in part on the quantified best practice providing an objective basis to deem the one or more solutions acceptable; and
means for relating the cost and/or the benefit to the at least one solution, wherein the benefit is calculated based on at least in part industry best practices.

19. The system of claim 18, wherein the financial measurement is any one of a net present value (NPV), a return on investment (ROI), a payback period, a total cost of ownership, and an internal rate of return (IRR).

20. The system of claim 18, further comprising means for generating a total financial measurement based on a plurality of financial measurements from a plurality of the one or more solutions.

21. The system of claim 18, further comprising establishing a cost basis and a benefit basis for each of the one or more solutions for using in computing the financial measurement.

22. The system of claim 21, wherein the cost basis includes ongoing costs and one-time costs and the benefit basis include ongoing benefits and one-time benefits.

23. A computer program product comprising a computer usable medium having readable program code embodied in the medium, the computer program product includes at least one component to:
determine one or more objectives associated with a business;
determine one or more capabilities of the business;
analyze at least one solution for one or more initiatives associated with the one or more objectives and the one or more capabilities;
create a value matrix having the one or more initiatives associated with the one or more objectives and the one or more capabilities;
generate a return on investment (ROI) based on results of the analysis which shows the contribution of the one or more initiatives to achieve the one or more objectives of the business; and
associate at least a cost and/or benefit to the at least one solution for use when generating the return on investment, wherein the benefit is calculated based on at least in part industry best practices.

* * * * *

UNITED STATES PATENT AND TRADEMARK OFFICE
CERTIFICATE OF CORRECTION

PATENT NO. : 7,603,304 B2
APPLICATION NO. : 11/075015
DATED : October 13, 2009
INVENTOR(S) : Asthana et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1022 days.

Signed and Sealed this

Fifth Day of October, 2010

David J. Kappos
*Director of the United States Patent and Trademark Office*